United States Patent
Henke et al.

(10) Patent No.: US 11,973,359 B2
(45) Date of Patent: Apr. 30, 2024

(54) METHOD AND CONTROL DEVICE FOR OPERATING A BATTERY SYSTEM AND BATTERY SYSTEM

(71) Applicant: MAN Energy Solutions SE, Augsburg (DE)

(72) Inventors: Moritz Henke, Augsburg (DE); Susanne Lehner, Augsburg (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 196 days.

(21) Appl. No.: 17/095,060

(22) Filed: Nov. 11, 2020

(65) Prior Publication Data
US 2021/0151997 A1   May 20, 2021

(30) Foreign Application Priority Data
Nov. 14, 2019 (DE) .................. 10 2019 130 683.3

(51) Int. Cl.
  *H02J 7/00* (2006.01)
(52) U.S. Cl.
  CPC .......... *H02J 7/0019* (2013.01); *H02J 7/0048* (2020.01); *H02J 7/0063* (2013.01)
(58) Field of Classification Search
  CPC ....... H02J 7/0019; H02J 7/0048; H02J 7/0063
  See application file for complete search history.

(56) References Cited

U.S. PATENT DOCUMENTS 9,812,878 B1\* 11/2017 Stieber ................ H02J 7/007
10,141,753 B2\* 11/2018 Hanada ................ H02J 7/045
(Continued)

FOREIGN PATENT DOCUMENTS

DE  112013001184 T5  11/2014
EP      2738912       6/2014
(Continued)

OTHER PUBLICATIONS

WO-2013167465-A1 machine translation, Wolff et al. Nov. 2013 (Year: 2013).*
(Continued)

*Primary Examiner* — Drew A Dunn
*Assistant Examiner* — Pamela J Jeppson
(74) *Attorney, Agent, or Firm* — Cozen O'Connor

(57) ABSTRACT

A method for operating a battery system connected to an electric energy system, having battery strings connected in parallel, including a battery, an inverter and a transformer Each battery is chargeable and dischargeable. Each battery has an installed, maximum charge capacity and a capacity that is available in the current operating state. During discharging the currently available capacity corresponds to a state-of-charge of the respective battery, and during charging the currently available capacity corresponds to a difference between the maximum charge capacity and the state-of-charge of the respective battery. A total charge output requested during the charging of the battery system and/or a total discharge output requested during the discharging of the battery system is distributed as part outputs over the battery strings and thus over the batteries dependent on the currently available capacities of the batteries of the battery strings connected in parallel.

12 Claims, 2 Drawing Sheets

(56) References Cited

U.S. PATENT DOCUMENTS

| | | | |
|---|---|---|---|
| 2011/0200852 A1* | 8/2011 | Fukuhara | H02J 3/32 |
| | | | 429/50 |
| 2012/0176094 A1* | 7/2012 | Okuda | H01M 10/482 |
| | | | 320/134 |
| 2014/0197686 A1* | 7/2014 | Hiramura | H02J 7/0018 |
| | | | 307/29 |
| 2016/0204480 A1 | 7/2016 | Triebel et al. | |
| 2018/0226811 A1 | 8/2018 | Hanada et al. | |

FOREIGN PATENT DOCUMENTS

| | | | | |
|---|---|---|---|---|
| EP | 2790290 | A2 | 10/2014 | |
| EP | 2985857 | | 2/2016 | |
| EP | 3206276 | | 8/2017 | |
| EP | 3264560 | | 1/2018 | |
| WO | WO-2013167465 A1 * | | 11/2013 | ......... B60L 11/1862 |

OTHER PUBLICATIONS

Office Action dated Sep. 17, 2020 issued in German Patent Application No. 102019130683.3.
Office Action dated May 17, 2021 issued in Finnish U.S. Appl. No. 20/206,067.
Office Action dated Aug. 21, 2023 issued in Canadian Patent Application No. 3,095,826.

* cited by examiner

METHOD AND CONTROL DEVICE FOR OPERATING A BATTERY SYSTEM AND BATTERY SYSTEM

BACKGROUND OF INVENTION

1. Field of the Invention

The invention relates to a method and to a control device for operating a battery system having multiple battery strings connected in parallel, each comprising a battery, an inverter, and a transformer. Furthermore, the invention relates to a battery system.

2. Description of Related Art

U.S. Pat. No. 10,141,753 B2 discloses a battery system having multiple battery strings connected in parallel. Each of the battery strings connected in parallel comprises a battery, an inverter, and a transformer each. Here, U.S. Pat. No. 10,141,753 B2 relates to details that make charging and discharging efficiently possible, wherein according to this prior art it is a prerequisite that a maximum available charge capacity of the batteries of the battery strings connected in parallel is not equal, but rather that at least one battery has a maximum charge capacity that is distinct from another battery.

SUMMARY OF THE INVENTION

There is a need for ensuring an efficient charging and discharging of a battery system with multiple battery strings connected in parallel each comprising a battery, an inverter, and a transformer even in particular when the batteries of the battery strings connected in parallel have a same or identical maximum charge capacity. There is therefore a need for a new type of method and control device for operating a battery system and for a corresponding battery system which make possible an efficient charging process and discharging process of the battery system regardless of the maximum charge capacity of the batteries of the battery strings connected in parallel, which can thus be employed in particular when all batteries have an identical maximum charge capacity and also in particular when the maximum charge capacities of the batteries are different.

One aspect of the invention is based on creating a new type of method and control device for operating a battery system and a battery system.

Each battery has an installed maximum charge capacity and a capacity that is available in the current operating state, wherein during discharging the currently available capacity corresponds to a state-of-charge of the respective battery, and wherein during the charging the currently available capacity corresponds to a difference between the maximum charge capacity and the state-of-charge of the respective battery. A total charge output requested during the charging of the battery system and/or a total discharge output requested during the discharging of the battery system is distributed as part outputs over the battery strings and thus over the batteries and thus divided dependent on the currently available capacities of the batteries of the battery strings connected in parallel.

One aspect of the invention present here is for discharging as well as charging of a battery system, to take into account the currently available capacities of the batteries connected in parallel that are available for discharging or charging and, dependent on the currently available capacities of the batteries of the battery strings connected in parallel, distribute and thus divide a requested total output, namely the requested total discharge output or the requested total charge output as part outputs over the battery strings and thus over the batteries of the battery strings. This allows an efficient charging and discharging of a battery system with relatively simple elements regardless of whether the maximum charge capacities of the individual batteries of the battery strings connected in parallel are identical or deviate from one another.

Preferentially, the total charge output requested during the charging or the total discharge output requested during the discharging of the battery system is distributed as part outputs over the battery strings in such a manner that such battery strings, whose batteries have a higher available capacity, compared with such battery strings, whose batteries have a lower available capacity, are used with priority and thus primarily for charging and discharging and loaded with a corresponding part output. This is particularly preferred in order to efficiently charge the batteries of battery strings of a battery system connected in parallel during a charge request and efficiently discharge the same during a discharge request.

According to an advantageous further development, multiple battery strings are simultaneously utilised and loaded with a part output, namely via part outputs that are in relation to one another corresponding to the respective currently available capacities of the respectively utilised batteries. Here it can be provided that not more than a defined part quantity of the battery strings, which maximally corresponds to a defined portion of the total quantity of the battery strings of the battery system, are simultaneously utilised and loaded with a part output. Furthermore it can be provided that only such battery strings of the battery system are utilised and loaded with a part output whose respective portion of their respective part output in the total output is greater than a defined first limit value. Furthermore it can be provided that the quantity of the simultaneously utilised battery strings is determined so that a quotient of the requested total charge output or the requested total discharge output and the sum of the available part outputs of the simultaneously utilised battery strings is greater than a defined second limit value and smaller than 1. This further development of one aspect of the invention is particularly preferred. Dependent on the above criteria, which can be employed alone or combined with one another, multiple battery strings are simultaneously utilised and, providing the requested total charge output or the requested total discharge output, are loaded with part outputs.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 2:
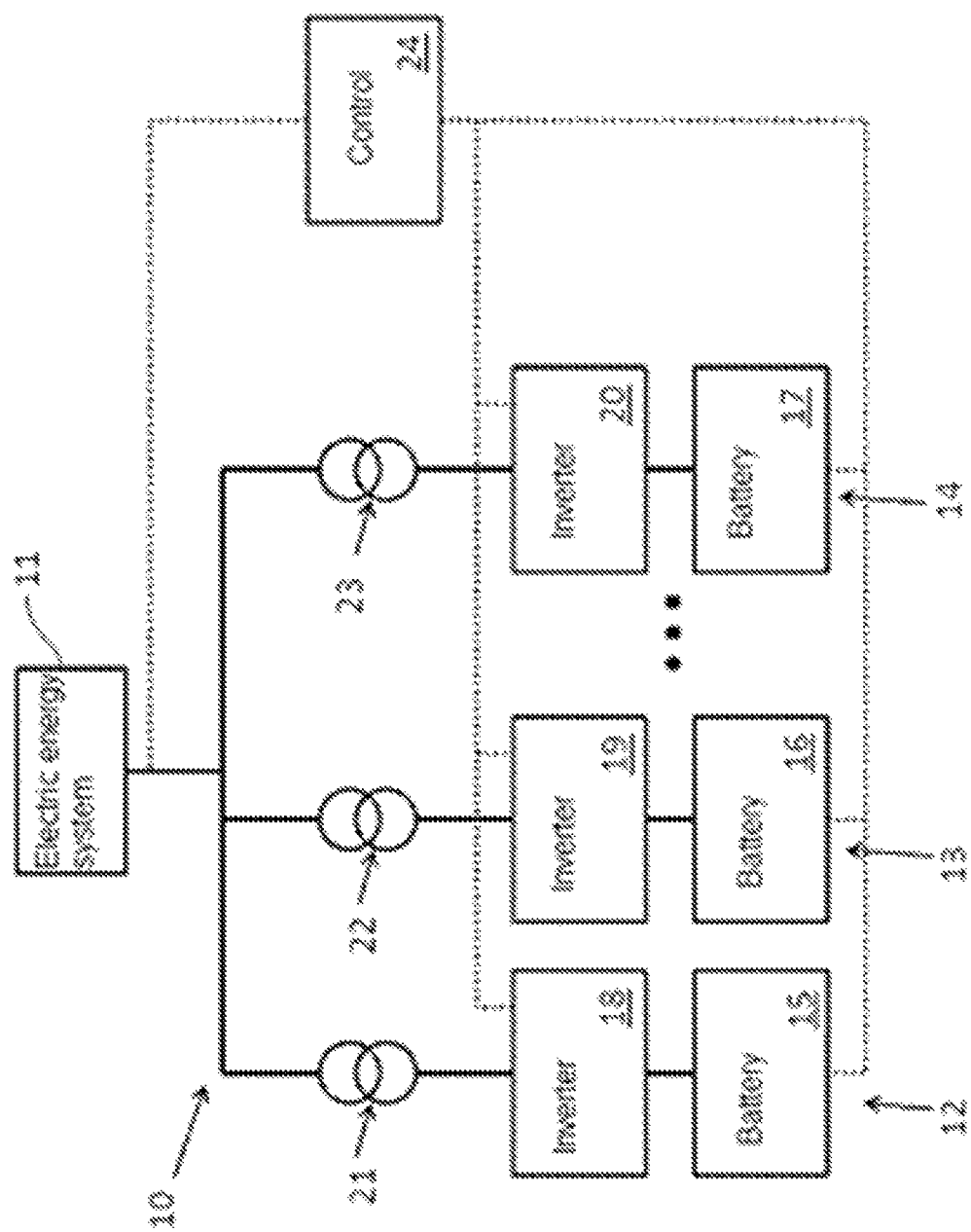
FIG. 2 is a schematic representation of a battery system for illustrating the invention.

FIG. 2 shows highly schematised a battery system 10, which is connected to an energy system 11. The energy system 11 is a power system, which either provides electric energy to be stored in the battery system 10, or which draws electric energy from the battery system 10 stored in the battery system 10 while discharging the battery system 10.

The battery system 10 according to one aspect of the invention comprises multiple battery strings 12, 13, and 14 connected in parallel. Each battery string 12, 13, and 14 comprises a battery 15, 16, or 17, an inverter 18, 19, and 20 as well as a transformer 21, 22, 23.

Furthermore, the battery system 10 comprises a control device or regulating device 24, which serves for operating the battery system 10 of the multiple battery strings 12, 13, 14 connected in parallel. According to the dotted lines of FIG. 2, the control device 24 exchanges data with the individual batteries 15, 16, and 17 as well as the individual inverters 18, 19, and 20, just as with the energy system 11.

Dependent on the operating state of the battery system 10, each battery 15, 16, and 17 can be charged and discharged. If electric energy is to be stored in the battery system 10, the batteries 15, 16, 17 can be charged to a greater degree. If by contrast electric energy is to be drawn from the battery system 10, the batteries 15, 16, 17 can be discharged to a greater degree in the process.

Each battery 15, 16, 17 has an installed, maximum charge capacity. The installed, maximum charge capacities of the batteries 15, 16, 17 of the battery strings 12, 13, 14 connected in parallel can be identical or deviate from one another.

In the current operating state of the battery system 10, each battery 15, 16, 17 has a currently available capacity. During discharging, this currently available capacity corresponds to a so-called state-of-charge (SOC) of the respective battery. During charging, the currently available capacity corresponds to a difference between the maximum charge capacity and the state-of-charge of the respective battery 15, 16, 17.

The capacities of the batteries 15, 16, 17 that are available in the current operating state are provided by the batteries 15, 16, 17 to the control device 24 as input quantity. Likewise, the total charge output requested during a charge operation or the total discharge output requested during a discharge operation is provided to the control device 24 as input quantity. Dependent on this, the control device 24 activates the inverters 18, 19, and 20 in order to provide an optimal and efficient charging operation or discharging operation. Here, the total charge output requested during the charging of the battery system and the total discharge output requested during the discharging of the battery system 10 is distributed as part outputs over the battery strings 12, 13, 14 and thus over the batteries 15, 16, 17 dependent on the currently available capacities of the batteries 15, 16, 17 of the battery strings 12, 13, 14 connected in parallel.

Here it is then preferentially provided that the requested total output, i.e. the total charge output requested during the charging as well as the total discharge output requested during discharging is distributed as part outputs over the battery strings 12, 13, 14 in such a manner that such battery strings 12, 13, 14, whose batteries 15, 16, 17 have a greater available capacity than such batteries 12, 13, 14, whose batteries 15, 16, 17 have a lower available capacity, are utilised with priority and thus primarily for charging and discharging and loaded with a corresponding part output.

Here, an ageing state and/or an ampere hour throughput and/or an operating hour loading of the batteries 15, 16, 17 can be additionally taken into account namely in such a manner that with priority and thus primarily such battery strings 12, 13, 14 are loaded with a part output for providing the requested total output, whose batteries 15, 16, 17, compared with other batteries of the battery system 10, in addition to a high available capacity, have a preferably low ageing and/or preferably low operating hours and/or a preferably low ampere hour throughput.

According to a first further development of one aspect of the invention it is possible that as few as possible battery strings 12, 13, 14 are simultaneously utilised simultaneously during a charging operation or discharging operation. This then takes place primarily in such a manner that a single battery string 12, 13, 14, which has the respectively greatest available capacity, is fully loaded via its respective part output before in the case, that this individual battery string cannot provide the requested total output alone via its part output, a further battery string is utilised and loaded with a corresponding part output. According to this further development, as few as possible battery strings are thus operated in parallel, if possible, merely a single battery string, before a further battery string is loaded with a corresponding part output. Here, that battery string is always loaded with priority or primarily or loaded additionally which has the respectively greatest currently available capacity.

Thus when, according to the first further development of one aspect of the invention, the loading of the battery string, whose battery has the greatest available capacity, is not sufficient for providing the requested total output, the battery string whose battery has the second greatest available capacity is additionally loaded. If the available capacity of the same is not sufficient either, the battery string, whose battery has the third highest available capacity, is additionally loaded.

According to a second further development of one aspect of the invention it is provided that preferably multiple battery strings 12, 13, 14 are always utilised simultaneously and loaded with a part output, namely with or via part outputs which are in relation to one another corresponding to the respective currently available capacities of the batteries 15, 16, 17 of the battery strings 12, 13, 14.

Here, all battery strings 12, 13, 14 can be simultaneously utilised according to a first form of the second further development of the invention, can be simultaneously utilised and loaded with a charge output, namely in relation to the currently available capacity of the respective battery 15, 16, 17 of the respective battery string 12, 13, 14.

According to a second form of the second further development of the invention it is provided that not all battery strings 15, 16, 17 connected in parallel are simultaneously utilised and loaded with a part output, but multiple ones, wherein the quantity of the part quantity of the utilised battery strings can be determined so that not more than a defined part quantity of the battery strings, which maximally corresponds to a defined portion of the total quantity of the battery strings of the battery system, are simultaneously utilised and loaded with a part output. Thus it can be provided for example that not more than 50% or not more than 75% of the total quantity of the battery strings 12, 13, 14 are simultaneously loaded with a part output.

According to a third form of the second further development, which can also be utilised additionally or alternatively with the second form of the second further development, the number of the battery strings 12, 13, 14 and thus batteries 15, 16, 17 utilised simultaneously and loaded with a part output can also be determined dependent on that only such battery strings 12, 13, 14 of the battery system 10 are utilised for a charging operation or discharging operation and loaded with a part output, whose portion of the respective part output in the total output, which is dependent on the currently available capacity, is greater than a defined first limit value. This means that only such battery strings 12, 13, 14 are utilised for charging or discharging, whose batteries 15, 16, 17 are operated with a defined minimum output which, as explained above, is dependent on the currently available capacity of the batteries. The respective first limit value corresponds to the respective minimum output. When during a charging operation or discharging operation a minimum load of a battery string is undershot, the same is switched off, no longer utilised for the charging operation or discharging operation and no longer loaded further with a part output. The respective part output is then distributed over the other battery strings. The number of the battery strings that are simultaneously utilised during a charging operation or discharging operation and loaded with a part output then changes dynamically.

Furthermore, the number of the simultaneously utilised battery strings and thus batteries for a charging operation or discharging operation can be determined according to a fourth form of the second further development, which can be utilised additionally or alternatively to the second and/or third form of the second further development, so that a quotient between the requested total output, i.e. the requested total charging output or the total discharging output, and the sum of the utilised available part outputs of the simultaneously utilised battery strings is greater than a defined second limit value and smaller or equal to 1. Thus, this quotient is for example between 0.7 (70%) and 1 (100%) or between 0.8 (80%) and 1 (100%). The lower of these values corresponds to the second limit value. Here, the number of the battery strings that are simultaneously loaded with a part output can also change dynamically.

In all forms of the second further development, batteries 15, 16, 17 and thus battery strings 12, 13, 14, which have a higher available capacity than batteries of other battery strings, are loaded primarily and thus with priority with a part output and thus primarily or with priority utilised for the respective charging operation or discharging operation.

As already explained, the ageing state and/or the ampere hour throughput and/or the operating hour load of the batteries 15, 16, 17 can also be taken into account in addition to the currently available capacity in order to decide which of the batteries is or are prioritised for a charging operation or discharging operation.

With one aspect of the invention, an effective charging and discharging of a battery system 10 having multiple battery strings 12, 13, 14 connected in parallel is possible, wherein each of the battery strings 12, 13, 14 comprises a battery 15, 16, 17 each, an inverter 18, 19, 20 each and a transformer 21, 22, 23 each, and wherein these battery strings are connected to an energy system 11, which either provides output for charging the battery system 10 or requests output for discharging the battery system 10.

One aspect of the invention, furthermore, relates to a control device 24 which is equipped to carry out the method described above on the control side. To this end, the control device 24 comprises data interfaces in order to exchange data with the assemblies involved in carrying out the method according to one aspect of the invention. Furthermore, the control device 24 comprises a processor for data processing and a memory for data storage. Furthermore, the invention relates to a battery system 10 having the multiple battery strings 12, 13 and 14 connected in parallel and the control device 24 according to the invention.

Figure 1:
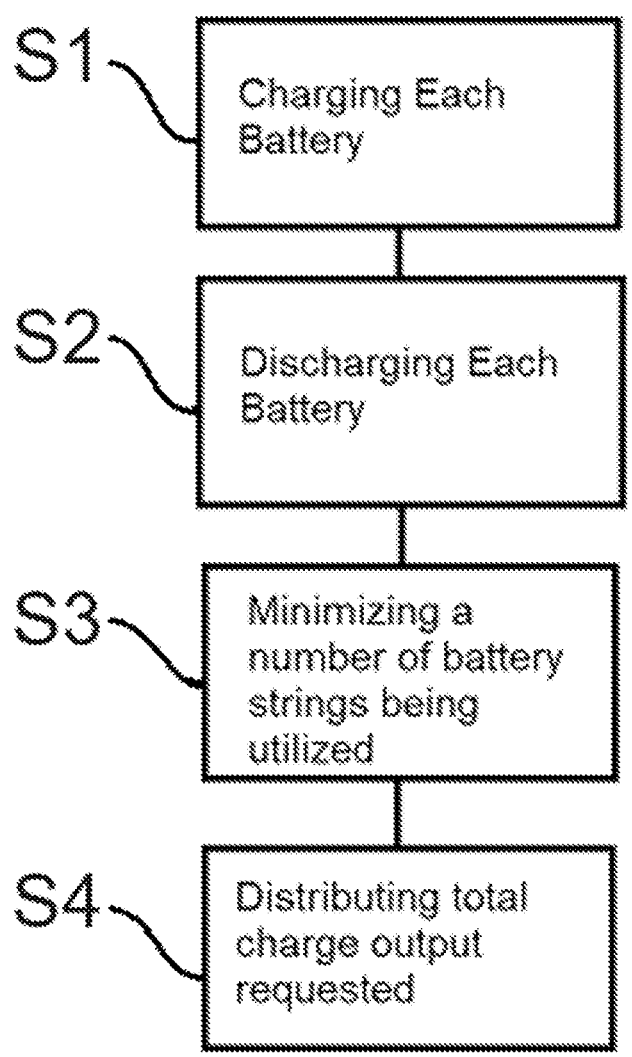
FIG. 1 is a flowchart for operating a battery system.

FIG. 1 is a flowchart depicting a method for operating a battery system connected to an electric energy system, having multiple battery strings connected in parallel, which each comprise a battery, an inverter, and a transformer. The method includes charging each battery in a string based at least in part on an operating state of the battery system, in which a storing of electric energy in the battery system is requested S1; discharging each battery in a string based at least in part on the operating state of the battery system, in which a drawing of electric energy from the battery system is requested S2; and minimizing a number of battery strings being simultaneously utilised simultaneously during a charging operation or discharging operation S3. The total discharge output requested during discharging of the battery system is distributed S4.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a battery system connected to an electric energy system, having multiple battery strings connected in parallel, which each comprise a battery, an inverter, and a transformer, comprising:
   charging each battery in a string based at least in part on an operating state of the battery system, in which a storing of electric energy in the battery system is requested;
   discharging each battery in a string based at least in part on the operating state of the battery system, in which a drawing of electric energy from the battery system is requested,
   wherein each battery has an installed, maximum charge capacity and a capacity that is available in the current operating state,
   wherein during the discharging a respective currently available capacity corresponds to a state of charge of the respective battery, and
   wherein during the charging the currently available capacity corresponds to a difference between the maximum charge capacity and the state of charge of the respective battery,
   wherein a total charge output requested during the charging of the battery system and/or a total discharge output requested during the discharging of the battery system is dependent on the currently available capacities of the batteries of the multiple battery strings connected in parallel is distributed as part outputs over the multiple battery strings and thus over the batteries, and
   minimizing a number of battery strings being simultaneously utilised simultaneously during a charging operation or discharging operation, wherein the minimum number of strings is based on the currently available capacities of the batteries of the multiple battery strings being greater than a defined first limit value.

2. The method according to claim 1, further comprising:
distributing as part outputs the total charge output requested during charging or the total discharge output requested during discharging of the battery system over the multiple battery strings such that such multiple battery strings, whose batteries have a higher available capacity, compared with such multiple battery strings, whose batteries have a lower available capacity, are utilised with priority and thus primarily for charging and discharging and loaded with a corresponding part output.

3. The method according to claim 2, wherein such multiple battery strings are utilised with priority and thus primarily for charging and discharging and loaded with a part output, whose batteries additionally have a lower ageing and/or fewer operating hours and/or a low ampere hour throughput.

4. The method according to claim 2, wherein the battery strings are simultaneously utilised such that a single battery string, which in each case has a greatest available capacity, is fully loaded via its respective part output before in a case that this battery string cannot provide the total charge output requested during the charging or the total discharge output requested during the discharging of the battery system via its part output alone, a further battery string is utilised and loaded with a part output.

5. The method according to claim 2, wherein the multiple battery strings are simultaneously utilised and loaded with a part output, via part outputs that are in a relation to one another corresponding to respective currently available capacities.

6. The method according to claim 5, wherein not more than a defined part quantity of part strings, which maximally corresponds to a defined portion of a total number of the battery strings of the battery system are simultaneously utilised and loaded with a part output.

7. The method according to claim 6, wherein only battery strings of the battery system are utilised and loaded with a part output, whose respective portion of their part output in a total output is greater than a defined first limit value.

8. The method according to claim 7, wherein a number of the simultaneously utilised battery strings is determined so that a quotient of a requested total charge output or total discharge output and a sum of available part outputs of the simultaneously utilised battery strings is greater than a defined second limit value and smaller or equal to 1.

9. The method according to claim 5, wherein all battery strings are simultaneously utilised and loaded with a part output.

10. The method according to claim 2, wherein the number of the battery strings that are simultaneously utilised during a charging operation or discharging operation and loaded with the part outputs changes dynamically.

11. A control device for operating a battery system, wherein the control device is configured to:
charge and discharge each battery based at least in part on an operating state of the battery system, in which either a storing of electric energy in the battery system or a drawing of electric energy from the battery system is requested,
wherein each battery has an installed, maximum charge capacity and a capacity that is available in the current operating state,
wherein during the discharging a currently available capacity corresponds to a state of charge of the respective battery, and
wherein during the charging the currently available capacity corresponds to a difference between the maximum charge capacity and the state of charge of the respective battery,
wherein a total charge output requested during the charging of the battery system and/or a total discharge output requested during the discharging of the battery system is dependent on currently available capacities of the batteries of the multiple battery strings connected in parallel is distributed as part outputs over the multiple battery strings and thus over the batteries on a control side and
wherein a number of battery strings being simultaneously utilised simultaneously is minimized during a charging operation or discharging operation, wherein the minimum number of strings is based on the currently available capacities of the batteries of the multiple battery strings being greater than a defined first limit value.

12. A battery system, comprising:
multiple battery strings connected in parallel, which comprise a battery, an inverter, and a transformer; and
a control device configured to:
charge and discharge each battery based at least in part on an operating state of the battery system, in which either a storing of electric energy in the battery system or a drawing of electric energy from the battery system is requested,
wherein each battery has an installed, maximum charge capacity and a capacity that is available in the current operating state,
wherein during the discharging the currently available capacity corresponds to a state of charge of the respective battery, and
wherein during the charging the currently available capacity corresponds to a difference between the maximum charge capacity and the state of charge of the respective battery,
wherein a total charge output requested during the charging of the battery system and/or a total discharge output requested during the discharging of the battery system is dependent on currently available capacities of the batteries of the battery strings connected in parallel is distributed as part outputs over the multiple battery strings and thus over the batteries, and
wherein a number of battery strings being simultaneously utilised simultaneously is minimized during a charging operation or discharging operation, wherein the minimum number of strings is based on the currently available capacities of the batteries of the multiple battery strings being greater than a defined first limit value.

* * * * *